Figure 1:
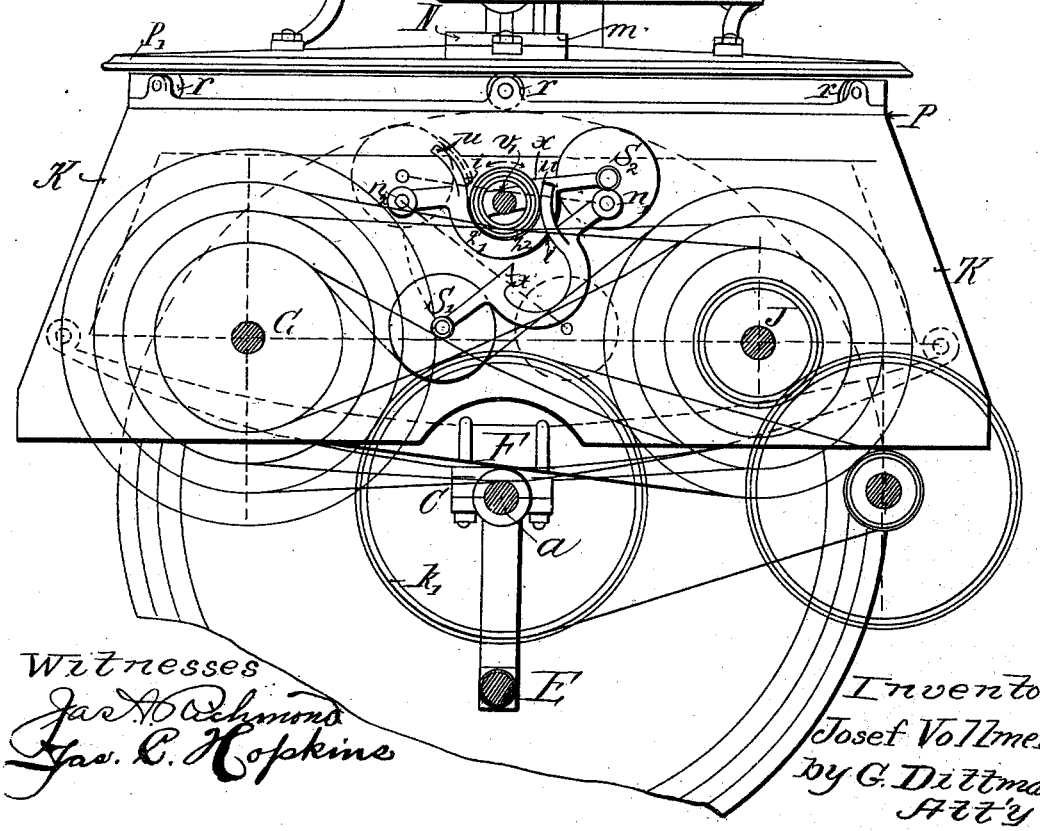

No. 670,746. Patented Mar. 26, 1901.
J. VOLLMER.
MOTOR ROAD VEHICLE.
(Application filed Apr. 15, 1899. Renewed Feb. 23, 1901.)
(No Model.) 5 Sheets—Sheet 1.

Witnesses
Jas. H. Richmond
Jas. C. Hopkins

Inventor
Josef Vollmer
by G. Dittmar
Att'y

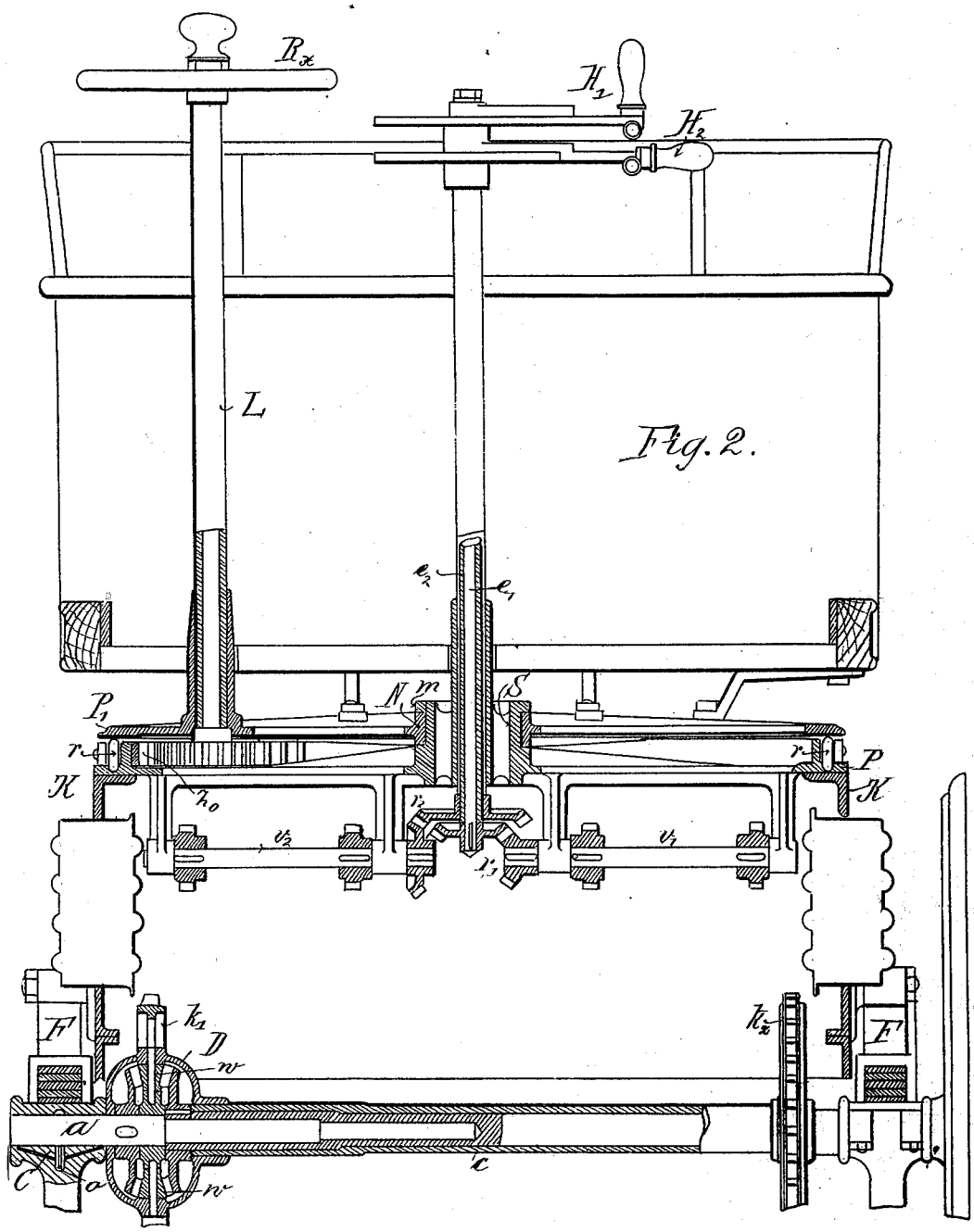

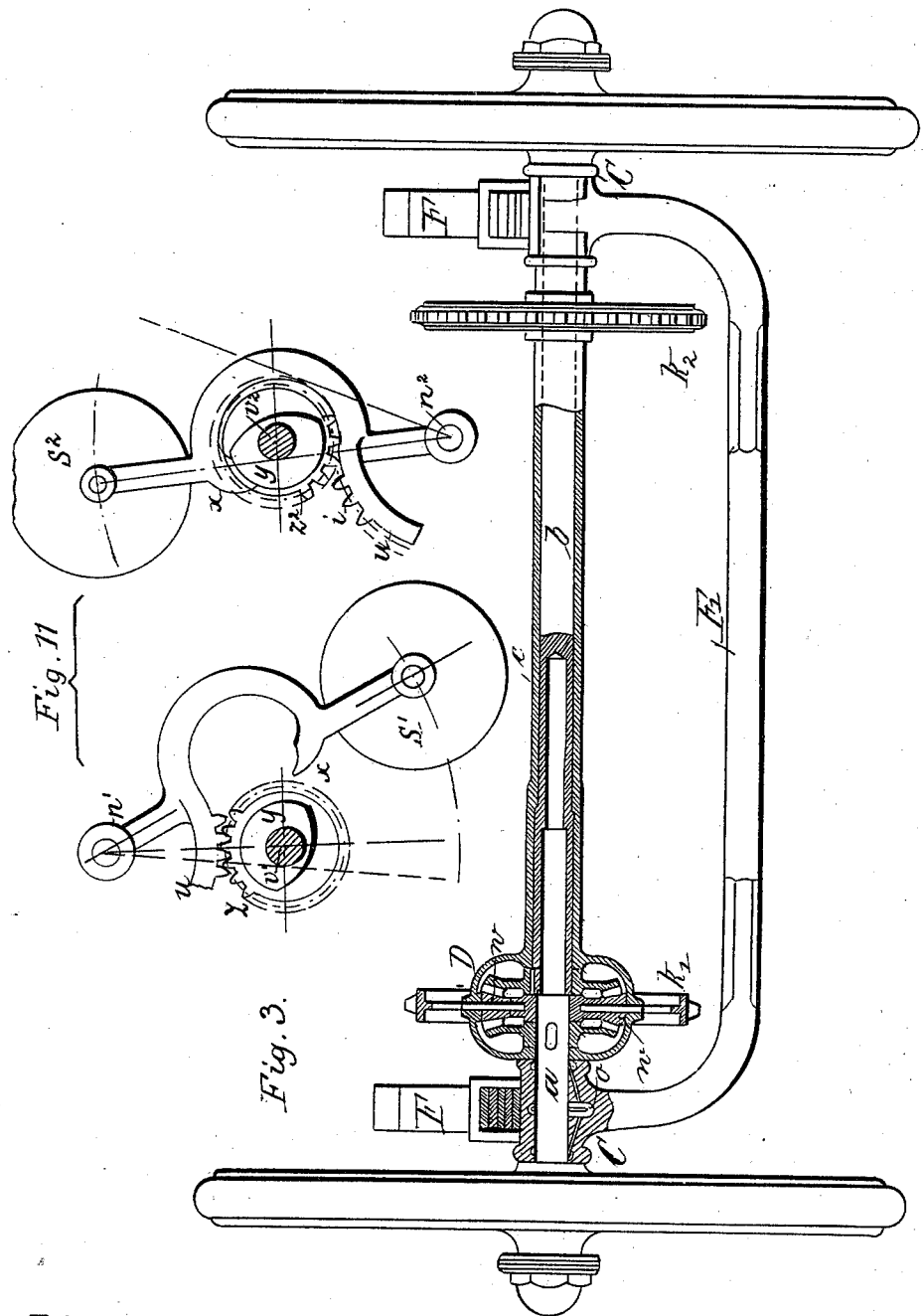

No. 670,746. Patented Mar. 26, 1901.
J. VOLLMER.
MOTOR ROAD VEHICLE.
(Application filed Apr. 15, 1899. Renewed Feb. 23, 1901.)
(No Model.) 5 Sheets—Sheet 4.
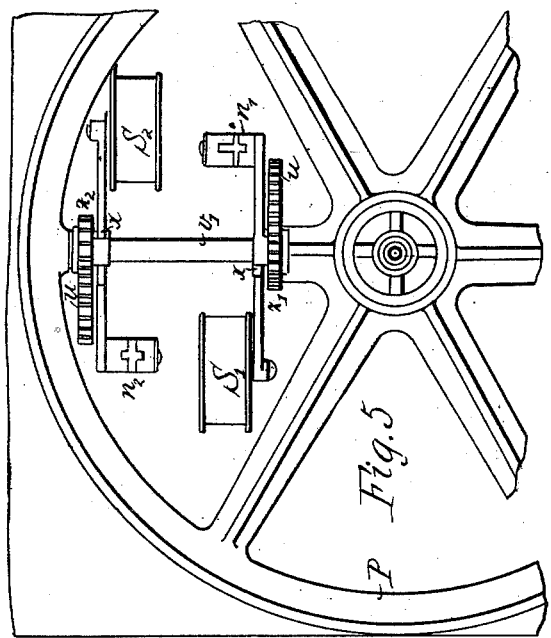
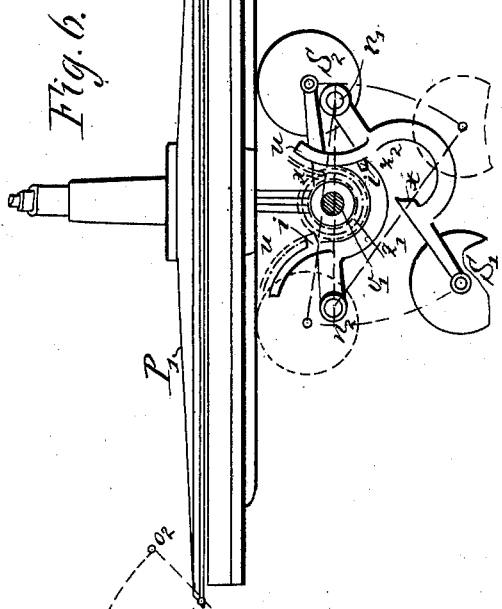
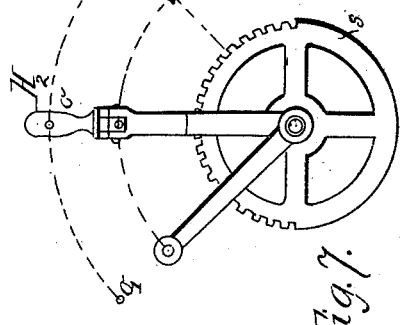
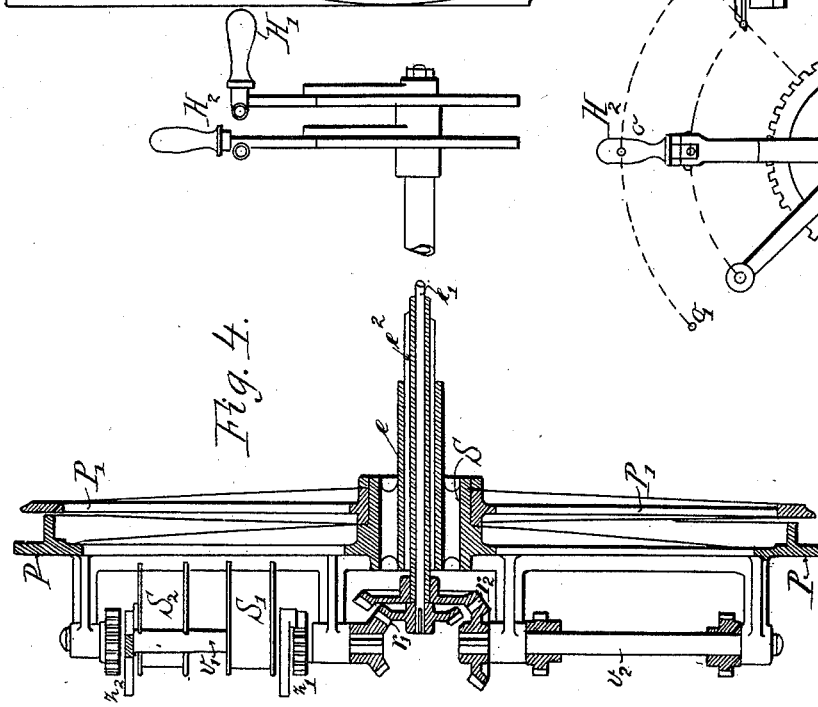
Witnesses:
Inventor
Josef Vollmer
by C. Dittmar
Att'y No. 670,746. Patented Mar. 26, 1901.
J. VOLLMER.
MOTOR ROAD VEHICLE.
(Application filed Apr. 15, 1899. Renewed Feb. 23, 1901.)
(No Model.) 5 Sheets—Sheet 5.
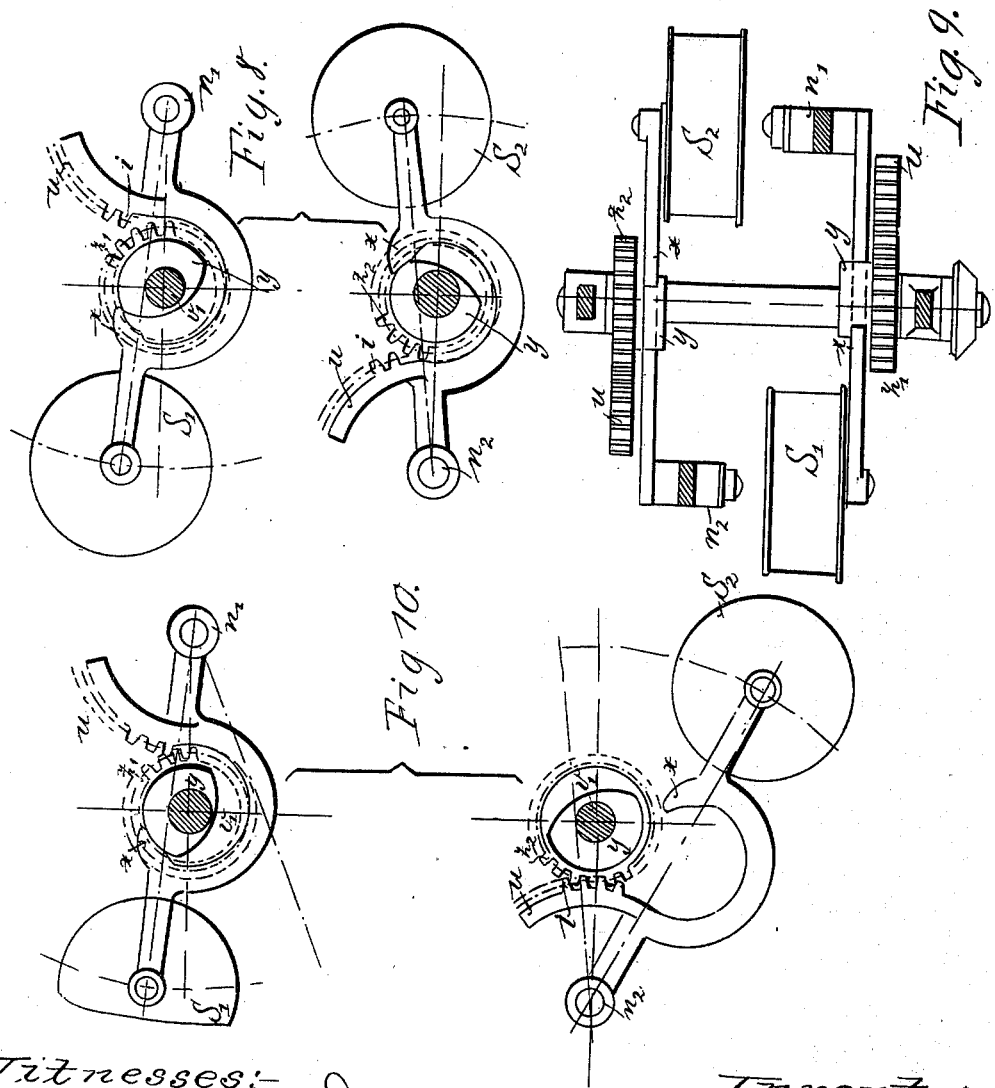
Witnesses:
Jas. A. Richmond
Jas. C. Hopkins
Inventor
Josef Vollmer
by C. Dittmar
Att'ys

UNITED STATES PATENT OFFICE.

JOSEF VOLLMER, OF BERLIN, GERMANY.

MOTOR ROAD-VEHICLE.

SPECIFICATION forming part of Letters Patent No. 670,746, dated March 26, 1901.

Application filed April 15, 1899. Renewed February 23, 1901. Serial No. 48,598. (No model.)

*To all whom it may concern:*

Be it known that I, JOSEF VOLLMER, engineer, a subject of the Emperor of Germany, residing at 31 Luisenstrasse, Berlin, in the Empire of Germany, have invented certain new and useful Improvements in Motor-Vehicles; and I do hereby declare the following to be a full, clear, and exact description of the invention, such as will enable others skilled in the art to which it appertains to make and use the same.

My invention relates to motor-vehicles, and more especially to means for converting ordinary vehicles into motor-vehicles without the necessity of altering the general form of the vehicle. To this end the front section of the ordinary vehicle is made removable and an axle arrangement carrying the driving-gear adapted to be substituted therefor when desired. The latter construction comprises the following elements: first, a movable axle which has the twofold advantage and object of diminishing as much as possible the sliding motion necessary for the rotation of the axle and of rendering the transmission of the motive force upon the axle independent of the various speeds of rotation of the wheel, and this without the use of intermediate gear, which it has been necessary to employ hitherto; second, a coupling mechanism which effects the engagement of the several mechanisms from the driver's seat, notwithstanding their rotation during turning, as the latter operation is effected by the rotation of the forward section of the vehicle and the engine-box as an entirety, and, third, gearing by means of which the driven shaft of the vehicle may be caused to rotate in either direction, notwithstanding the fact that the driving-shaft continues to rotate in the same direction.

The invention is illustrated in the drawings accompanying and forming a part of the specification, in which—

Figure 1 is a side elevation showing the general arrangement of the forward part of the vehicle, motor mechanism, and housing therefor. Fig. 2 is a cross-section through the same, taken upon the front axle. Fig. 3 is a section through the revoluble axle. Fig. 4 is a section through the plates P P' and allied parts, showing the tube $e$, also a detail of the operating-levers. Fig. 5 is a plan view. Figs. 6 to 11 are details of the coupling mechanism.

Referring to the drawings, it will be seen that the whole of the driving-gear is arranged in a rectangular box or housing K, Figs. 1 and 2, situated above the center of the axle-wheel, the top plate P of said housing being suspended from the pivot-plate P' by means of pivot-block S, as shown. Said top plate P carries a toothed crown $Z°$, provided with internal teeth, which are connected with the hollow pivot S. The pivot-block S is rotatably mounted in the hub N of the pivot-plate P' and is retained by nut $m$. Upon the bearing-plate P' is rigidly attached the steering-rod L, served at its upper extremity with a hand-wheel $R^×$. Said rod terminates at its lower end in a crown-wheel, whose teeth mesh with the internal teeth Z of the plate P. Rollers or balls $r$ are also provided on the bearing-surfaces of plates P P' for the purpose of diminishing friction. In order to decrease sliding motion, the differences in the rotation of the wheels upon rounding curves are compensated by means of a differential gear D, which is mounted directly upon the axle $a$ and at one end of the same for economy of space, Figs. 1 and 3. The differential gear D is situated directly between the two members $a$ and $b$ of the driving-axle, and in order that the latter may form a rigid entirety the shorter member $a$ is sleeved within the member $b$, as shown in Figs. 2 and 3. By this arrangement the axle-bearings C are relieved from lateral strain, while the provision of an intermediate bearing for the separable members $a$ $b$, such as has hitherto been employed, is rendered unnecessary.

In order that both the springs F, which, it will be observed, carry the housing K, may support an equal load upon the two bearings C, motion is imparted by means of the chain or gear wheels $k'$ $k^2$ in such a manner that both act simultaneously upon the bevel-pinions $w$ $w$ of differential gear D, which is effected by means of sleeve c, the length of axle b thereby still further obviating any necessity for the provision of an intermediate bearing.

The axle-bearings C are made in two parts, whereby the members a b can be readily inserted. The upper halves of the bearings C, which form a strap or staple, are directly connected with the springs F, by which the entire engine-box and forward section of the vehicle are carried. The lower halves of the bearings are connected by means of a bent shaft E, which imparts the necessary stability to the bearings and maintains the distance between them transversely always constant. Lubrication is effected by means of annular lubricators o, served with the lubricant through suitable ducts, as shown.

The device illustrated in Figs. 4 to 11 enables the mechanism to be thrown into and out of gear from the driver's seat.

The parts required for throwing the motor into gear, consisting of tension-pulleys and the requisite operating-levers $H'$ $H^2$, are supported upon the top plate P of the engine-box. Through this plate P at the point where it is pivoted passes the hollow pivot-block S, which extends into the pivot-plate P' at its center in such a manner that during the turning of the vehicle it is capable of angular displacement with respect to the plate P, as seen in Fig. 4. Within the tube $k$ are arranged the upright tubes $e$ $e'$ $e^2$, serving to regulate the motive power. The object of this arrangement is that when the top plate P rotates the vertical tubes may rotate with it. By this means it is possible to regulate the movement of the under frame, which is itself turning, in a very simple manner, while the position of the front section with respect to the vehicle proper is indicated to the operator.

The vertical tube $e'$ is rigidly connected with the operating-lever $H'$ and the outer tube $e^2$ with the operating-lever $H^2$, both said tubes being sleeved in the outer tube or sleeve $e$, which latter is rigidly fixed in the pivot S of top plate P and at its upper portion carries the locking-disk $s$ of the operating-levers. The lower extremities of the tubes $e$ $e'$ are connected with the bevel-pinions $r'$ $r^2$, Figs. 2 and 4, thereby enabling the shafts $v'$ $v^2$, journaled in the top plate P, to be rotated by turning one of the operating-levers $H'$ $H^2$ from $o$ toward $o'$ or from $o$ toward $o^2$, Fig. 7, in a right or left hand direction. The object of this arrangement is that a pair of tension-pulleys $S'$ $S^2$, Figs. 1, 2, 4, and 11, may be so operated that one of them only—$S'$, for example—stretches the belt, imparting motion to the vehicle, while the other tension-pulley $S^2$ remains motionless.

The operation and arrangement of the tension-pulley gear are illustrated in Figs. 8 to 11, in which a pair of tension-pulleys $S'$ $S^2$, arranged upon the shaft $v$, are shown in various positions. In Figs. 8 and 9 the two tension-pulleys $S'$ $S^2$, which are arranged upon levers pivoted upon opposite points $n'$ $n^2$ upon the top plate P, are shown disengaged—that is to say, in both cases the toothed pinions $z'$ $z^2$, mounted upon the shaft $v'$, are out of engagement with the toothed segments $u$ of the tension-pulley levers. In addition to this lever the lower teeth $i$ of the toothed segments $u$ are raised a certain distance above the points of the teeth of the segments $z'$ $z^2$, because the noses $x$ upon the tension-pulley levers rest upon the concentric portion of the cam-shaped hubs $y$ of the toothed pinions $z'$ $z^2$. If the shaft $v'$ is caused to rotate in a left-hand direction, for example, by means of the hand-lever $H'$, Fig. 10, the nose $x$ of the tension-pulley $S^2$ falls along the reduced cam-shaped portion of the hub $y$, and the teeth $i$ gear with teeth $z^2$, thereby displacing the tension-pulley $S'$, which remains stationary, because the nose $x$ continues to slide upon the concentric portion of the hub $y$, and thus experiences no displacement. Only when the operating-lever is drawn back does the tension-pulley resume the initial position, Fig. 8, and upon continuing to rotate the lever the tension of pulley $S'$ becomes operative, while $S^2$ remains stationary. The pair of tension-pulleys of the hand-lever $H^2$ act in a similar manner. Motion is effected by means of stepped pulleys G and J, Fig. 1, receiving motion from the motor through suitable means and imparting motion to one another through the medium of loose belts adapted to be tightened by the tension device operating in the manner described.

Having thus described my invention, I claim—

1. In a vehicle, a revoluble front axle embodying male and female portions, journals upon the axle connected by an integral bracket, motor-gearing supporting by the axle, a pivot-block fast upon the body of the vehicle, a supporting-plate rigid with the journals and having pivotal connection with said pivot-block, interposed bearings, said plate having an upwardly-turned flange toothed on its inner periphery, a change-gear supported by said plate, a steering device extending to near the operator's seat, and having operative connection with the supporting-plate, to turn the same, a controller for the vehicle, having a separate connection with the change-gear, and a locking device for the controller, substantially as described.

2. The combination of a pivoted lever having its middle portion curved and prolonged to form a nose $x$ and a toothed sector $u$, a belt-pulley $S'$ revolubly mounted in the end of said lever, a toothed pinion adapted to engage said sector, and a cam $y$, as and for the purpose set forth.

3. In a vehicle, a vehicle-body, a driving-gear for the vehicle, a plate rigid with the front portion of the vehicle, a pivot-plate mounted to rotate thereon and having internal teeth, a steering-rod having a crown-wheel adapted to engage said toothed pivot-plate to turn the same, ball-bearings for said pivot-plate, a controller, a locking device therefor, a stepped pulley J included in said driving-gear, another stepped pulley G, belts loosely connecting the pair, the tension-pulleys $S'$ $S^2$ for tightening said belts, and means operated by the controller whereby when one of said tension-pulleys is operating, the other is held inactive, substantially as described.

In witness whereof I have hereunto set my hand in presence of two witnesses.

JOSEF VOLLMER.

Witnesses:
WOLDEMAR HAUPT,
HENRY HASPER.